(12) United States Patent
Wiley et al.

(10) Patent No.: US 11,971,578 B2
(45) Date of Patent: Apr. 30, 2024

(54) MULTI-AXIS POSITIONER

(71) Applicant: 3SAE TECHNOLOGIES, INC., Franklin, TN (US)

(72) Inventors: Robert Wiley, Franklin, TN (US); Brett Clark, Whites Creek, TN (US)

(73) Assignee: 3SAE TECHNOLOGIES, INC., Franklin, TN (US)

( * ) Notice: Subject to any disclaimer, the term of this patent is extended or adjusted under 35 U.S.C. 154(b) by 0 days.

(21) Appl. No.: 17/570,474

(22) Filed: Jan. 7, 2022

(65) Prior Publication Data

US 2022/0206222 A1 Jun. 30, 2022

Related U.S. Application Data

(60) Continuation of application No. 16/930,638, filed on Jul. 16, 2020, now Pat. No. 11,269,143, which is a (Continued)

(51) Int. Cl.
*G02B 6/25* (2006.01)
*F16M 11/04* (2006.01)
(Continued)

(52) U.S. Cl.
CPC ......... *G02B 6/2555* (2013.01); *F16M 11/041* (2013.01); *F16M 11/12* (2013.01);
(Continued)

(58) Field of Classification Search
CPC .. G02B 6/2555; G02B 6/2553; G02B 6/3616; F16M 11/041; F16M 11/12; F16M 11/18; F16M 11/32
See application file for complete search history.

(56) References Cited

U.S. PATENT DOCUMENTS 3,288,421 A 11/1966 Peterson
3,871,778 A 3/1975 Schulte et al.
(Continued)

FOREIGN PATENT DOCUMENTS

CN 1492252 4/2004
CN 201438227 4/2010
(Continued)

OTHER PUBLICATIONS

Excerpts from Chase, Kenneth & Gao, Jinsong & Magleby, Spencer & Sorensen, Carl. (2000). Including Geometric Feature Variations in Tolerance Analysis of Mechanical Assemblies. IIE Transactions (Institute of Industrial Engineers). 28. 10.1080/15458830.1996. 11770732. (Year: 2000).*

(Continued)

*Primary Examiner* — Peter Radkowski
(74) *Attorney, Agent, or Firm* — Onello & Mello, LLP

(57) ABSTRACT

A parallel position manipulator includes a top plate, a baseplate and a plurality of prismatic joint actuators. Each actuator includes an actuator joint having five Degrees of Freedom (DOF) at either the base plate or the top plate. When one or more of the actuators extends or contracts, the pivot points, or five DOF actuator joint, of the remaining actuators are allowed to shift in any axis other than that actuator's primary axis of motion.

20 Claims, 15 Drawing Sheets

Related U.S. Application Data continuation of application No. 16/275,601, filed on Feb. 14, 2019, now Pat. No. 10,746,928, which is a division of application No. 15/720,006, filed on Sep. 29, 2017, now Pat. No. 10,429,587.

(60) Provisional application No. 62/402,674, filed on Sep. 30, 2016.

(51) Int. Cl.
| | |
|---|---|
| *F16M 11/12* | (2006.01) |
| *F16M 11/18* | (2006.01) |
| *F16M 11/32* | (2006.01) |
| *G02B 6/255* | (2006.01) |
| *G02B 6/36* | (2006.01) |

(52) U.S. Cl.
CPC ............. *F16M 11/18* (2013.01); *F16M 11/32* (2013.01); *G02B 6/2553* (2013.01); *G02B 6/3616* (2013.01)

(56) References Cited

U.S. PATENT DOCUMENTS

| | | | |
|---|---|---|---|
| 4,142,776 A | 3/1979 | Cherin et al. | |
| 4,396,247 A | 8/1983 | Simon et al. | |
| 4,773,727 A * | 9/1988 | Le Pivert | G02B 7/004 |
| | | | 29/466 |
| 4,911,522 A | 3/1990 | Iwamoto et al. | |
| 4,971,422 A | 11/1990 | Herse | |
| 5,114,300 A | 5/1992 | Shahinpoor et al. | |
| 5,168,221 A | 12/1992 | Houston | |
| 5,168,617 A | 12/1992 | Tsuchida et al. | |
| 5,279,176 A | 1/1994 | Tahmasebi et al. | |
| 5,303,035 A | 4/1994 | Luecke et al. | |
| 5,487,125 A | 1/1996 | Kammlott et al. | |
| 5,614,918 A | 3/1997 | Dinardo et al. | |
| 5,656,905 A | 8/1997 | Tsai | |
| 5,752,834 A * | 5/1998 | Ling | G09B 9/12 |
| | | | 434/58 |
| 5,754,582 A | 5/1998 | Dong | |
| 5,859,947 A | 1/1999 | Kiryuscheva et al. | |
| 5,905,829 A | 5/1999 | Maenishi et al. | |
| 5,962,949 A | 10/1999 | Dhuler et al. | |
| 5,986,827 A * | 11/1999 | Hale | G02B 7/004 |
| | | | 359/822 |
| 6,079,169 A | 6/2000 | Ashworth | |
| 6,135,683 A | 10/2000 | Kim et al. | |
| 6,174,092 B1 * | 1/2001 | Siala | G02B 6/4257 |
| | | | 385/91 |
| 6,402,329 B1 * | 6/2002 | Bailly | G02B 7/1822 |
| | | | 359/872 |
| 6,457,864 B1 * | 10/2002 | Chang | H02N 2/0095 |
| | | | 384/247 |
| 6,479,548 B2 | 11/2002 | Patterson et al. | |
| 6,498,892 B1 | 12/2002 | Harman | |
| 6,555,983 B1 | 4/2003 | Davies | |
| 6,603,239 B1 | 8/2003 | Michely et al. | |
| 6,606,444 B2 | 8/2003 | Harman et al. | |
| 6,612,754 B2 | 9/2003 | Dahmani et al. | |
| 6,690,864 B1 | 2/2004 | Dee et al. | |
| 6,765,733 B1 * | 7/2004 | Igl | G02B 7/003 |
| | | | 359/872 |
| 6,786,649 B2 | 9/2004 | Sherrer | |
| 6,842,994 B2 * | 1/2005 | McInroy | G01D 11/10 |
| | | | 269/71 |
| 6,871,548 B2 | 3/2005 | Helmer et al. | |
| 6,873,478 B2 * | 3/2005 | Watson | G03F 7/70833 |
| | | | 359/811 |
| 6,905,259 B2 * | 6/2005 | Smith | G02B 6/32 |
| | | | 403/143 |
| 6,964,288 B2 | 11/2005 | Christopher et al. | |
| 6,975,799 B2 | 12/2005 | Kim et al. | |
| 7,068,891 B1 | 6/2006 | Cook et al. | |
| 7,070,342 B2 | 7/2006 | Bush et al. | |
| 7,242,537 B2 * | 7/2007 | Weber | G03F 7/70833 |
| | | | 359/223.1 |
| 7,275,332 B2 | 10/2007 | Blanding | |
| 7,371,020 B2 | 5/2008 | Kanda et al. | |
| 7,407,333 B2 | 8/2008 | Horino et al. | |
| 7,522,323 B2 | 4/2009 | Clube | |
| 7,568,854 B2 | 8/2009 | McMurtry | |
| 7,656,075 B2 | 2/2010 | Voigtlaender et al. | |
| 7,706,922 B2 * | 4/2010 | Ueno | B25J 9/1623 |
| | | | 318/632 |
| 7,851,769 B2 * | 12/2010 | Schmid | H01J 37/26 |
| | | | 250/306 |
| 7,878,470 B2 * | 2/2011 | Oh | F16M 13/02 |
| | | | 248/278.1 |
| 8,179,621 B2 * | 5/2012 | Muehlbeyer | G02B 7/1822 |
| | | | 359/822 |
| 8,227,674 B2 | 7/2012 | Brown | |
| 8,333,766 B2 | 12/2012 | Edelhauser et al. | |
| 8,624,967 B2 | 1/2014 | O'Connell et al. | |
| 8,752,283 B2 | 6/2014 | Barwicz et al. | |
| 8,886,287 B2 | 11/2014 | Larson et al. | |
| 8,886,331 B2 | 11/2014 | Labadie et al. | |
| 8,900,009 B2 * | 12/2014 | Hornick | F16M 13/022 |
| | | | 439/38 |
| 8,956,068 B2 | 2/2015 | Mekid et al. | |
| 9,103,994 B2 | 8/2015 | Jones et al. | |
| 9,146,360 B2 | 9/2015 | Chen | |
| 9,234,561 B2 * | 1/2016 | Laurens | B64G 1/38 |
| 9,364,925 B2 | 6/2016 | Barwicz et al. | |
| 9,480,532 B2 | 11/2016 | Stuart | |
| 9,694,455 B2 | 7/2017 | Brown et al. | |
| 9,773,601 B2 | 9/2017 | Breiwa et al. | |
| 9,783,133 B2 | 10/2017 | Huelke et al. | |
| 9,944,217 B2 | 4/2018 | Schroeder et al. | |
| 10,416,391 B2 | 9/2019 | Froggatt et al. | |
| 10,429,587 B2 | 10/2019 | Wiley et al. | |
| 10,739,529 B2 | 8/2020 | Froggatt et al. | |
| 10,746,928 B2 | 8/2020 | Wiley et al. | |
| 11,269,143 B2 | 3/2022 | Wiley et al. | |
| 2001/0055449 A1 | 12/2001 | Sherrer | |
| 2002/0009271 A1 | 1/2002 | Herve et al. | |
| 2002/0015568 A1 | 2/2002 | Dahmani et al. | |
| 2002/0032218 A1 | 3/2002 | Patterson et al. | |
| 2002/0176683 A1 | 11/2002 | Harman et al. | |
| 2003/0007774 A1 | 1/2003 | Christopher et al. | |
| 2003/0061699 A1 | 4/2003 | Appleby et al. | |
| 2003/0106230 A1 | 6/2003 | Hennessey | |
| 2003/0123808 A1 * | 7/2003 | Smith | G02B 6/32 |
| | | | 359/822 |
| 2003/0196314 A1 | 10/2003 | Appleby et al. | |
| 2003/0234917 A1 * | 12/2003 | Watson | G03F 7/70833 |
| | | | 355/53 |
| 2004/0013509 A1 | 1/2004 | Roy et al. | |
| 2004/0028338 A1 | 2/2004 | Dee et al. | |
| 2004/0052470 A1 | 3/2004 | Kim et al. | |
| 2004/0093753 A1 * | 5/2004 | McInroy | G01D 11/10 |
| | | | 33/613 |
| 2004/0179794 A1 | 9/2004 | Horino et al. | |
| 2004/0190838 A1 | 9/2004 | Bush et al. | |
| 2004/0255696 A1 | 12/2004 | Helmer et al. | |
| 2005/0230052 A1 | 10/2005 | Christopher et al. | |
| 2005/0276550 A1 | 12/2005 | Kanda et al. | |
| 2006/0007563 A1 * | 1/2006 | Weber | G03F 7/709 |
| | | | 359/819 |
| 2006/0186285 A1 | 8/2006 | Blanding | |
| 2007/0024938 A1 | 2/2007 | Clube | |
| 2007/0035856 A1 * | 2/2007 | Galpin | G02B 7/004 |
| | | | 359/819 |
| 2007/0052301 A1 * | 3/2007 | Muehlbeyer | G02B 7/1822 |
| | | | 310/12.01 |
| 2007/0091397 A1 | 4/2007 | Clube | |
| 2007/0125917 A1 * | 6/2007 | Oh | F16M 11/18 |
| | | | 248/176.1 |
| 2007/0231061 A1 | 10/2007 | McMurtry | |
| 2007/0279851 A1 * | 12/2007 | Oh | G06F 1/1601 |
| | | | 361/679.01 |

(56) References Cited

U.S. PATENT DOCUMENTS

| | | | |
|---|---|---|---|
| 2008/0039973 A1* | 2/2008 | Ueno | B25J 9/1641 |
| | | | 318/560 |
| 2008/0204551 A1 | 8/2008 | O'Connell et al. | |
| 2009/0009033 A1 | 1/2009 | Voigtlaender et al. | |
| 2009/0050776 A1 | 2/2009 | Muehlbeyer et al. | |
| 2009/0146075 A1* | 6/2009 | Schmid | H02N 2/0095 |
| | | | 250/311 |
| 2010/0069740 A1 | 3/2010 | Larson et al. | |
| 2010/0157270 A1* | 6/2010 | Muehlbeyer | G02B 7/1828 |
| | | | 355/67 |
| 2010/0234844 A1 | 9/2010 | Edelhauser et al. | |
| 2011/0094364 A1 | 4/2011 | Brown | |
| 2011/0319913 A1 | 12/2011 | Labadie et al. | |
| 2012/0168593 A1 | 7/2012 | Mekid et al. | |
| 2012/0282052 A1 | 11/2012 | Boria | |
| 2013/0068915 A1 | 3/2013 | Yang | |
| 2013/0078855 A1* | 3/2013 | Hornick | H01R 13/73 |
| | | | 439/571 |
| 2013/0085531 A1 | 4/2013 | Hartman et al. | |
| 2013/0195416 A1 | 8/2013 | Jones et al. | |
| 2013/0283584 A1 | 10/2013 | Barwicz et al. | |
| 2013/0283591 A1 | 10/2013 | Barwicz et al. | |
| 2013/0299669 A1* | 11/2013 | Laurens | B64G 1/641 |
| | | | 248/573 |
| 2013/0304087 A1 | 11/2013 | Stuart | |
| 2014/0145059 A1 | 5/2014 | Anderson et al. | |
| 2014/0150593 A1 | 6/2014 | Brown et al. | |
| 2014/0151947 A1 | 6/2014 | Brown et al. | |
| 2014/0374564 A1 | 12/2014 | Schroeder et al. | |
| 2015/0239082 A1 | 8/2015 | Krouglicof et al. | |
| 2016/0068117 A1 | 3/2016 | Huelke et al. | |
| 2016/0082647 A1 | 3/2016 | Amro et al. | |
| 2016/0259374 A1 | 9/2016 | Breiwa et al. | |
| 2018/0095223 A1 | 4/2018 | Wiley et al. | |
| 2018/0172920 A1 | 6/2018 | Froggatt et al. | |
| 2019/0179080 A1 | 6/2019 | Wiley et al. | |
| 2019/0391341 A1 | 12/2019 | Froggatt et al. | |
| 2021/0003778 A1 | 1/2021 | Wiley et al. | |
| 2022/0206222 A1 | 6/2022 | Wiley et al. | |

FOREIGN PATENT DOCUMENTS

| | | |
|---|---|---|
| CN | 201984183 | 9/2011 |
| DE | 19715226 | 10/1998 |
| ES | 2320064 | 5/2009 |
| FR | 2964337 | 3/2012 |
| JP | 64505 | 1/1989 |
| JP | 0351792 | 3/1991 |
| JP | 3608125 | 1/2005 |
| JP | 2005140185 | 6/2005 |
| JP | 2007505345 | 3/2007 |
| JP | 2008136521 | 6/2008 |
| JP | 2019536989 | 12/2019 |
| WO | 2018064462 | 4/2018 |

OTHER PUBLICATIONS

Excerpts from http://ecoursesonline.iasri.res.in/mod/page/view.php?id=1305 (Year: 2014).*

S. Rasakatla and K. M. Krishna, "RAMA-1 highly dexterous 48DOF robotic hand using magnetic spherical joints," 2013 IEEE International Conference on Robotics and Biomimetics (ROBIO), Shenzhen, China, 2013, pp. 816-823, doi: 10.1109/ROBIO.2013.6739563. (Year: 2013).*

Almonacid et al., "Motion Planning of a Climbing Parallel Robot", IEEE Transactions on Robotics and Automation, V. 19, No. 3, Jun. 2003.

Bai et al., "Direct Field-Feedback Control of a Ball-Joint-Like Permanent-Magnet Spherical Motor", IEEE/ASME Transactions on Mechatronics, vol. 19, No. 3, Jun. 2014.

Bayani et al., "Design of Hyper Redundant Robot Using Ball Screw Mechanism Approach", 2015 IEEE International Conference on Advanced Intelligent Mechatronics (AIM), Jul. 7-11, 2015, Busan, Korea.

Chinese Office Action and Search Report dated Dec. 24, 2021 issued in corresponding Chinese Application No. 201780070876.5.

Extended European Search Report dated Apr. 17, 2020 issued in corresponding European Application No. 17857487.7.

International Search Report and Written Opinion dated Dec. 23, 2021 issued in related International Application No. PCT/US2021/051234.

International Search Report And Written Opinion dated Dec. 7, 2017, issued in corresponding International Application No. PCT/US17/54272.

Japanese Office Action dated Aug. 17, 2021 issued in corresponding Japanese Application No. 2019-517816, with machine translation to English.

Office Action dated Mar. 25, 2021 issued in corresponding European Application No. 17857487.7.

Masao Tachikura, "Fusion mass-splicing for optical fibers using electric discharges between two pairs of electrodes", Appl. Opt. 23, 492-498 (1984).

PI, Fiber Positioners, Catalogue, 2012.

Slocum, Alexander. "Linkages", MIT, Jan. 1, 2008, available at https://web.mit.edu/2.75/fundamentals/FUNdaMENTALs%20Book%20pdf/FUNdaMENTALs%20T.

Chinese Office Action dated Jul. 15, 2022 issued in corresponding Chinese Application No. 201780070876.5, with English translation.

Office Action dated Sep. 30, 2022 issued in corresponding European Application No. 17857487.7.

Japanese Office Action dated May 30, 2023 issued in corresponding Japanese Application No. 2022057127, with English translation.

\* cited by examiner

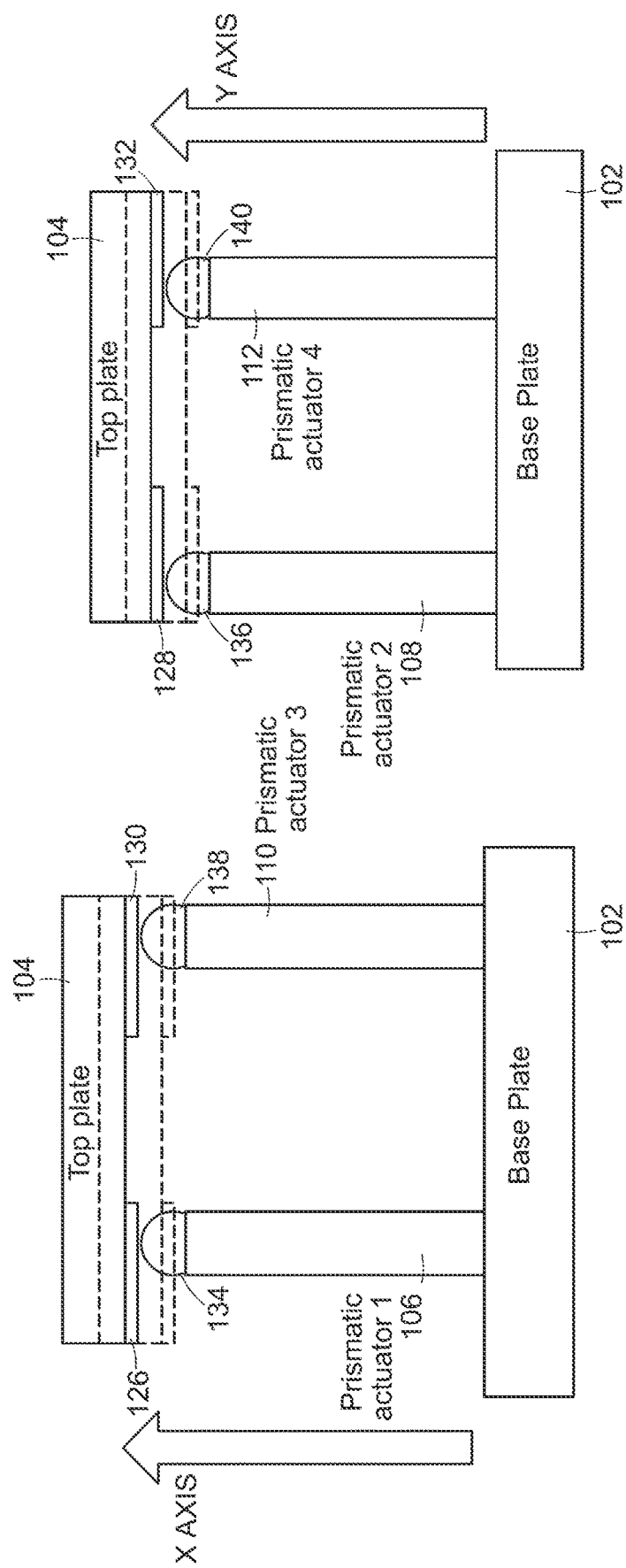

|  | Actuator 1 | Actuator 2 | Actuator 3 | Actuator 4 |
|---|---|---|---|---|
| X+ | Extend | | Extend | |
| Y+ | | Extend | | Extend |
| X- | Retract | | Retract | |
| Y- | | Retract | | Retract |
| Pitch + | Extend | | | Retract |
| Yaw + | | Extend | | Retract |
| Pitch - | Retract | | | Extend |
| Yaw - | | Retract | | Extend |

FIG. 10

|  | Actuator 1 | Actuator 2 | Actuator 3 | Actuator 4 | Actuator 5 |
|---|---|---|---|---|---|
| Z+ | | | | | Extend |
| Z- | | | | | Retract |

FIG. 11

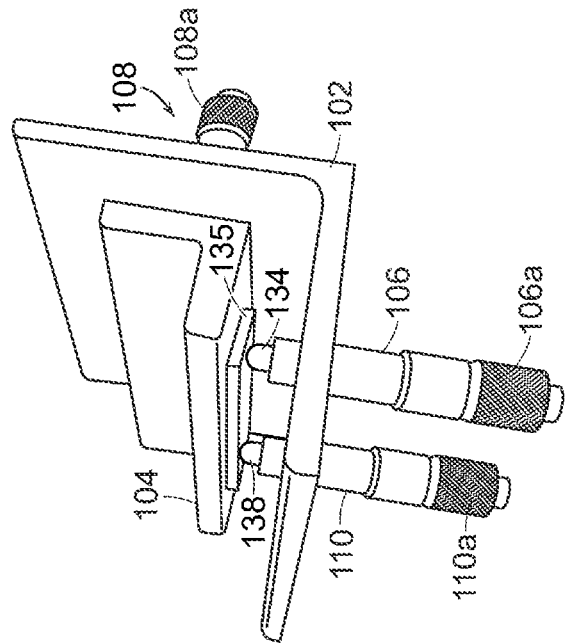
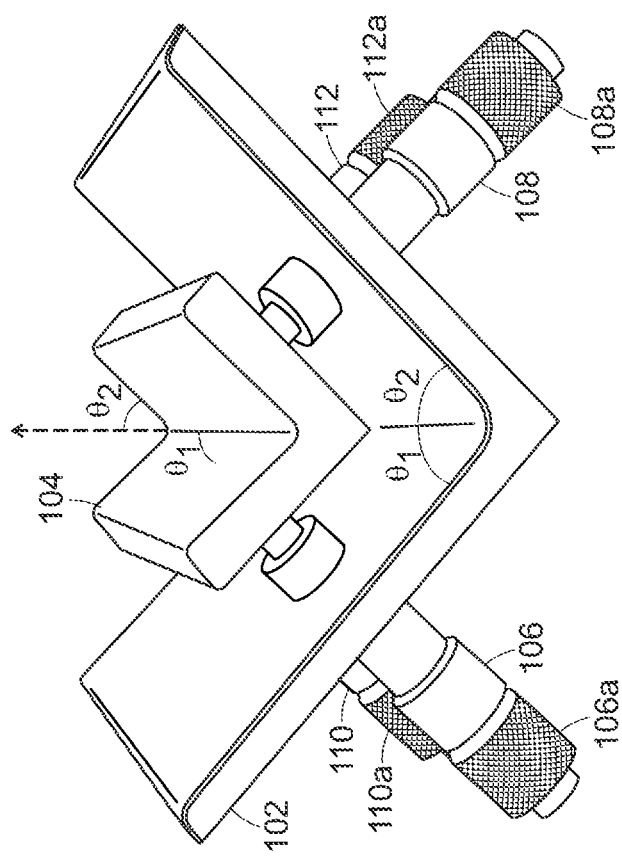
FIG. 14A
FIG. 14B

MULTI-AXIS POSITIONER

RELATED APPLICATIONS

This application is a continuation of U.S. patent application Ser. No. 16/930,638, filed on Jul. 16, 2020, which is a continuation of U.S. patent application Ser. No. 16/275,601, filed on Feb. 14, 2019, now issued U.S. Pat. No. 10,746,928, issued on Aug. 18, 2020 and entitled MULTI-AXIS POSITIONING METHOD, which is a divisional of U.S. patent application Ser. No. 15/720,006, filed on Sep. 29, 2017, now issued U.S. Pat. No. 10,429,587, issued on Oct. 1, 2019 and entitled MULTI-AXIS RELATIVE POSITIONING STAGE; which claims benefit of U.S. Provisional Application No. 62/402,674, filed on Sep. 30, 2016, and entitled MULTI-AXIS RELATIVE POSITIONING STAGE, which are hereby incorporated by reference in their entirety.

FIELD OF INTEREST

Inventive concepts relate to a positioning stage and, in particular, to a multi-axis relative positioning stage.

BACKGROUND

Position manipulators are employed in a vast array of applications to position objects, tool, or instruments with varying degrees of precision. A survey of kinematic joints, or kinematic pairs, that may be used in position manipulators are illustrated in FIG. 1, including: rigid (no motion), prismatic, revolute, parallel cylinders, cylindrical, spherical, planar, edge slider, cylindrical slider, point slider, spherical slider, and crossed cylinder.

The Stewart Platform (also referred to herein as a hexapod) is a multi-axis positioning stage made up of six actuators with spherical, ball, or universal joints at both ends of each actuator, for example. Hexapods are considered the world class multi-axis positioning stage design for most applications, but are often cost-prohibitive. One problem with hexapods is that it is a synergistic motion platform because of the mutual interaction of the actuators. That is, due to the mutual interaction of the actuators, none of the actuators can be moved independently; a given move requires many or all of the actuators to move to different specific amounts and at different speed profiles to prevent the stage from binding. Additionally, these motion and speed profiles change continuously as the defined starting and ending points are changed. For this reason, a highly complex computer algorithm is required to individually calculate the distance to travel and speed profiles necessary for each actuator to get the top plate of the stage from point A to point B, even if a short distance single axis move is desired. As a result, a human operator is incapable of manually performing, even this simple move, without binding the stage.

Another significant disadvantage with a hexapod is that the stiffness of the joints (against off axis motion) dictates the "slop," or "play," and, therefore, the resolution of the stage. This is a design conflict because it is exponentially more difficult to make spherical joints (employed in hexapods) at tighter and tighter tolerances. That is, in the case where a designer makes a world class spherical bearing to maximize stage resolution and minimize slop, he has, by default, exacerbated two inherent issues. First, because of the rigidness of the spherical joints, the accuracy of the motion and speed profile requirements for each actuator increases exponentially to prevent binding. Second, the capability requirements of the actuators increases exponentially in order to achieve the required precision motions and speed profiles. As a result, improving the resolution of a hexapod requires an exponential increase in computing power for determining motion and speed profiles, an exponential increase in the performance capabilities of the actuators, and twelve high quality spherical bearings. All of these factors drive up the cost of a hexapod significantly.

Although hexapods typically cost from three to ten times as much as their kinematic chain counterpart, they are often preferred because they do not suffer from tolerance stack up issues. Ten microns of precision is not an uncommon positioner requirement for many applications and, for example, in the photonics industry, submicron precision is often required. At this date, hexapods typically cost from $60,000 to greater than $120,000, each depending on physical size, load limits, and precision requirements. An alternative precise position manipulator would be highly desirable.

SUMMARY

In accordance with principles of inventive concepts, a parallel position manipulator includes a top plate, a base plate (also referred to herein as a bottom plate or baseplate) and three, four, five or six prismatic joint actuators. Each actuator includes an actuator joint having five Degrees of Freedom (DOF) at either the base plate or the top plate. In operation, when one or more of the actuators extends or contracts the pivot points, e.g., five DOF actuator joints, of the remaining actuators are allowed to shift in any axis other than that actuator's axis of motion (that is, an axis defined by the actuator's extension and contraction). In example embodiments, magnetic force, gravity, and/or a pliable polymer, such as silicone, may be employed to keep the up to five DOF pivot points in contact with their respective (that is, top or bottom) plate in a contact region when the prismatic actuators are extended or retracted. In example embodiments at least two of the prismatic actuators are perpendicular to at least two other prismatic actuators. If a fifth axis is added, its associated prismatic actuator is arranged perpendicular to the other four prismatic actuators.

In example embodiments the actuators may be any of several types, such as: piezo actuators, manual micrometer screws, magnetic actuators, stepper motors with linear actuators (either integral or separate), hydraulic cylinders, pneumatic cylinders, or rotary motors with eccentric cams, for example. In example embodiments in accordance with principles of inventive concepts, the parallel position manipulator is configured such that the push and pull forces exerted by each actuator is greater than the shear friction of all the other actuators combined. In example embodiments this is accomplished by employing materials that have a high holding force but a low shear force, for example, such as a hard metal spherical surface magnetically held in contact with a hard flat metal surface. In such embodiments only one of the sides (that is, either the hard metal spherical surface or the hard flat metal surface) is magnetized, because if both sides are magnetic they will be semi-constrained in the sliding axis and, therefore, behave like a spherical three DOF joint.

In accordance with principles of inventive concepts, a positioning stage includes a plurality of magnetic prismatic joint actuators, a base plate and a top plate. The top plate may support a device for precise positioning thereof. The top plate may be supported by a plurality of magnetic prismatic joint actuators, which are, in turn, supported by the base plate. In example embodiments, each actuator is fixed to a portion of the baseplate, which positions each actuator at an angle to the horizontal. In example embodiments, the angle is forty-five degrees, which thereby positions actuators on opposite ends, or endpieces of the baseplate and ninety degrees to one another. In example embodiments, sides of the top plate are formed at the same angle to the horizontal as sides of the baseplate, although other configurations are contemplated within the scope of inventive concepts. Magnets are provided on the angled sides of the top plate. Each actuator includes, at its distal end, a magnetic material, which may be a ferrous metal, for example. In example embodiments, the magnetic material is in the shape of a hemisphere, but other shapes and combinations are contemplated within the scope of inventive concepts. In preferred embodiments, each magnetic material end is configured to contact a magnet on a side of the top plate to thereby support the top plate above the baseplate.

In operation, an actuator distal end is held in contact with a magnet on a side of the top plate through force of the magnet. As an actuator is activated (that is, extended or retracted), the top plate moves linearly in the direction of motion determined by the motion of the actuator. The distal end of an actuator in contact with a magnet on the opposite side of the top plate remains in contact with the magnet, through the magnetic force of the magnet operating upon the magnetic material of the actuator's distal end. At the same time, the distal end of this actuator allows the magnet (and top plate) to slide in a direction dictated by the motion of the activated actuator.

In accordance with the inventive concepts, provided is a parallel positioner, comprising a top plate, a baseplate, and three or more actuators configured to support the top plate over the baseplate and to move the top plate in response to extension or retraction of one or more actuators, wherein each of the actuators includes a joint having five degrees of freedom.

In various embodiments, each of the actuators includes a magnetic joint as a five degree of freedom joint.

In various embodiments, the top plate includes angled sides and the actuators are configured to extend from the baseplate to the top plate and to support the top plate along the angled sides of the top plate.

In various embodiments, in a neutral position, the angled sides of the top plate are at the same angle to the horizontal as the angled sides of the baseplate.

In various embodiments, each magnetic joint includes an end of an actuator formed of a hemispherical magnetic material and a magnet in a contacting region of a plate.

In various embodiments, each magnetic joint is formed on a side of the top plate, each respective actuator end forming the joint is configured to contact a magnet on the side of the top plate and each respective opposing end of the actuator is configured to be fixedly attached to the baseplate.

In various embodiments, the parallel positioner includes four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle to the horizontal.

In various embodiments, the actuators are configured such that the same amount of extension or retraction of any pair of actuators produces movement of the top plate solely along a single axis, and said extension or retraction is carried out under control of an electronic controller.

In accordance with another aspect of the inventive concept, provided is a method of positioning a device, comprising providing a top plate upon which the device rests, providing a baseplate to support the top plate, and providing three or more actuators between the top plate and baseplate, the actuators configured to support the top plate over the baseplate and moving the top plate by extension or retraction of one or more actuators, wherein each of the actuators includes a joint having five degrees of freedom.

In various embodiments, each of the actuators includes a magnetic joint as a five degree of freedom joint.

In various embodiments, the top plate includes angled sides and the actuators are configured to extend from the baseplate to the top plate and to support the top plate along angled sides of the top plate.

In various embodiments, in a neutral position, the angled sides of the top plate are at the same angle to the horizontal as angled sides of the baseplate.

In various embodiments, each magnetic joint includes an end of an actuator formed of a hemispherical magnetic material and a magnet in a contacting region of a plate.

In various embodiments, each magnetic joint is formed on a side of the top plate, each respective actuator end of the joint is configured to contact a magnet on the side of the top plate and each respective opposing end of the actuator is configured to be fixedly attached to the baseplate.

In various embodiments, the method of positioning includes providing four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle to the horizontal.

In various embodiments, the actuators are configured such that the same amount of extension or retraction of any pair of actuators produces movement of the top plate solely along a single axis and said extension or retraction is carried out under control of an electronic controller.

In accordance with another aspect of the inventive concept, provided is a photonic positioning device, comprising a photonic device, a top plate supporting the photonic device, a baseplate, and three or more actuators configured to support the top plate over the baseplate and to move the top plate in response to extension or retraction of one or more actuators, wherein each of the actuators includes a joint having five degrees of freedom.

In various embodiments, the photonic device is an optical fiber splicer.

In various embodiments, the photonic positioning device further comprises four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle to the horizontal.

In various embodiments, the actuators are configured such that the same amount of extension or retraction of any pair of actuators produces movement of the top plate solely along a single axis, and said extension or retraction is carried out under control of an electronic controller.

In accordance with another aspect of the inventive concepts, provided is a parallel positioner, comprising a top plate, a baseplate, and at least four actuators configured to support the top plate over the baseplate and to move the top plate in response to extension or retraction of one or more actuators, wherein at least some of the actuators includes a joint having five degrees of freedom.

In various embodiments, each of the actuators includes a joint having five degrees of freedom.

In various embodiments, less than all of the actuators includes a joint having five degrees of freedom.

In various embodiments, at least one of the actuators includes a joint having four degrees of freedom.

In various embodiments, top plate includes a first angled side and a second angled side and the baseplate includes a first angled side piece corresponding to and parallel with the first angled side and a second angled side piece corresponding to and parallel with the second angled side.

In various embodiments, the baseplate includes an intermediate portion from which the side pieces and extend.

In some embodiments, the intermediate portion is planar.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 5 shows a first (left) side view of the four-axis stage of FIG. 2, with the first and third actuators extended along the "X AXIS", wherein a second actuator (not shown) is behind the first actuator and a fourth actuator (not shown) is behind the third actuator;

FIG. 6 shows a second (right) side view, opposite the first (left) side view, of the four-axis stage of FIG. 2, with the second and fourth actuators extended along the "Y AXIS", wherein the first actuator (not shown) is behind the second actuator and third actuator (not shown) is behind the fourth actuator;

FIG. 10 shows a table of single axis/dual actuator moves that can be applied to a four-axis stage, in accordance with principles of the inventive concepts;

FIG. 11 shows a table of single axis/single actuator moves that can be applied to a five-axis stage, in accordance with principles of the inventive concepts;

FIGS. 14A-C are views of another embodiment of a four-axis stage using manual actuators capable of single digit micron precision, in accordance with principles of the inventive concepts;

DETAILED DESCRIPTION OF PREFERRED EMBODIMENTS

Figure 1:
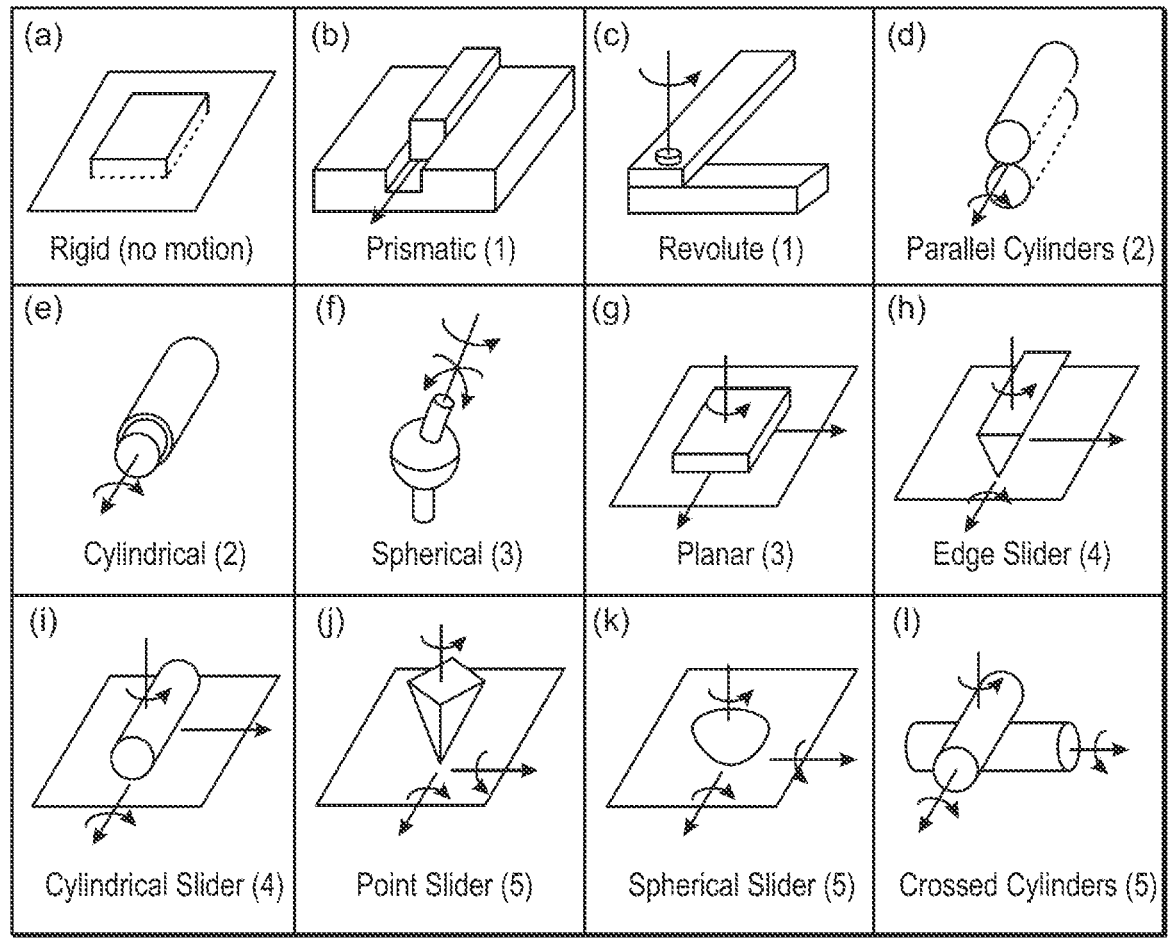
FIG. 1 illustrates a variety of conventional kinematic joints.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In example embodiments in accordance with principles of inventive concepts, a parallel position manipulator includes a top plate, a base plate, and four, five, six or more prismatic joint actuators. In preferred embodiments, each actuator includes an actuator joint having five Degrees of Freedom (DOF) at either the base plate or the top plate. In operation, when one or more of the actuators extends or contracts, the pivot points of the remaining actuators are allowed to shift in any axis other than that actuator's axis of motion (that is, an axis defined by the actuator's extension and contraction).

In example embodiments, magnetic force, gravity, and/or a pliable polymer, such as silicone, may be employed to keep the five DOF pivot points in contact with their respective (that is, top or bottom) plate when the prismatic actuators are retracted.

In some example embodiments, at least two of the prismatic actuators can be perpendicular to at least two other prismatic actuators.

In some embodiments, a fifth axis of movement can be added. If a fifth axis is added, its associated prismatic actuator can be arranged perpendicular to the other four prismatic actuators.

In example embodiments the actuators may be any of several types, such as: piezo actuators, manual micrometer screws, magnetic actuators, stepper motors with linear actuators (either integral or separate), hydraulic cylinders, pneumatic cylinders, or rotary motors with eccentric cams, for example. In example embodiments in accordance with principles of inventive concepts, the parallel position manipulator is configured such that the push and pull forces exerted by each actuator is greater than the shear friction of all the other actuators combined. In example embodiments this is accomplished by employing materials that have a high holding force but a low shear force, for example, such as a hard metal spherical surface magnetically held in contact with a hard flat metal surface. In such embodiments only one of the sides (that is, either the hard metal spherical surface or the hard flat metal surface) is magnetized, because if both sides are magnetic they will be semi-constrained in the sliding axis and, therefore, behave like a spherical 3 DOF joint.

In example embodiments in accordance with principles of inventive concepts, a positioning stage includes a plurality of magnetic prismatic joint actuators, a base plate and a top plate. The top plate may support a device for precise positioning thereof. The top plate may be supported by a plurality of magnetic prismatic joint actuators, which are, in turn, supported by the base plate. In example embodiments, each actuator is fixed to a portion of the baseplate, which positions each actuator at an angle to the horizontal. In example embodiments, sides of the top plate are formed at the same angle to the horizontal as sides of the baseplate, although other configurations are contemplated within the scope of inventive concepts. Magnets are provided on the angled sides of the top plate. Each actuator includes, at its distal end, a magnetic material, which may be a ferrous metal, for example. In example embodiments, the magnetic material is in the shape of a hemisphere, but other shapes and combinations are contemplated within the scope of inventive concepts. Each magnetic material end is configured to contact a magnet on a side of the top plate to thereby support the top plate above the baseplate.

In some embodiments, the magnet on the side of the top plate conforms to an outer surface of the top plate. For example, the top plate can have cross section with a planar shape, a V-shape, a semi-cylindrical shape, or another shape.

In operation, an actuator distal end is maintained in contact with a magnet on an outer surface or side of the top plate through force of the magnet. As an actuator is activated, e.g., extended or retracted, the top plate moves linearly in the direction of motion determined by the motion of the actuator. Therefore, the actuator can be extendible and retractable along an axis. The distal end of an actuator in contact with a magnet on an opposite side of the top plate remains in contact with the magnet, through the magnetic force of the magnet operating upon the magnetic material of the actuator's distal end. At the same time, the distal end of such actuator allows the magnet (and top plate) to slide in a direction dictated by the motion of the activated actuator. With respect to activation, this opposite side actuator can be passive, i.e., not activated, or activated in a different direction, in various embodiments.

A positioning stage in accordance with principles of inventive concepts can take the form of a parallel position manipulator. Because it is a parallel position manipulator, it does not suffer from the mechanical stack up issues associated with multiple single axis stages stacked on top of each other in what may be referred to as a kinematic chain. Additionally, unlike a hexapod, a positioning stage in accordance with principles of inventive concepts allows for any combination of the four actuators to extend or contract any amount at any speed without the stage binding. Each actuator can be arranged to affect movement in two different axes of the top plate of the stage. To implement a single axis of motion, two actuators may be moved in a manner in which they complement one another in the desired axis and cancel each other in an undesired axis. As a result, in example embodiments in accordance with principles of inventive concepts, all single-axis stage moves employ dual actuator moves. Single-axis stage moves, and the associated actuator actions, are shown in the tables of FIGS. 10 and 11.

In addition to being a parallel actuator, a positioning stage in accordance with principles of inventive concepts can have several other benefits. For example, a positioning stage in accordance with principles of inventive concepts is scalable from four to six axes, incrementally, whereas a Stewart Platform always has three or six axes. Unlike a kinematic chain, a positioning stage in accordance with principles of inventive concepts does not exhibit tolerance stack up of individual stages. A positioning stage in accordance with principles of inventive concepts does not require rotary or linear bearings, whereas a kinematic chain requires one for each axis of freedom. With a positioning stage in accordance with principles of inventive concepts, each axis of motion only requires two actuators that move at a fixed, intuitive ratio and, therefore, desired motion is relatively easy to achieve. As previously indicated, this is not the case with a Stewart Platform. Additionally, unlike a Stewart Platform, the speed of actuation need not be controlled to prevent stage binding and individual actuators can be moved without binding the stage. In example embodiments, the positioning stage top plate may be readily removed and replaced simply by decoupling the interfaces, such as a magnetic interfaces.

In example embodiments the resolution and stiffness of the stage may be determined by the quality of the actuators, the smoothness of the spherical slider components, and the strength of the magnetic (or other) force holding the spherical slider joints together. All of these aspects can be optimized to create a submicron precision stage for a small fraction of the cost of a similar precision hexapod. In many cases, a positioning stage in accordance with principles of inventive concepts will outperform a standard kinematic chain while, at the same time, being more cost-effective. In example embodiments, the holding force (for example, magnetic holding force) of an actuator spherical slider (or other five DOF connection) is greater than the coefficient of friction of all of the other actuator joints. When this is true, the top plate will settle at an equilibrium that allows the four (or more) connections to slide or pivot as needed to ensure that all of the points of contact are maintained.

Figure 15:
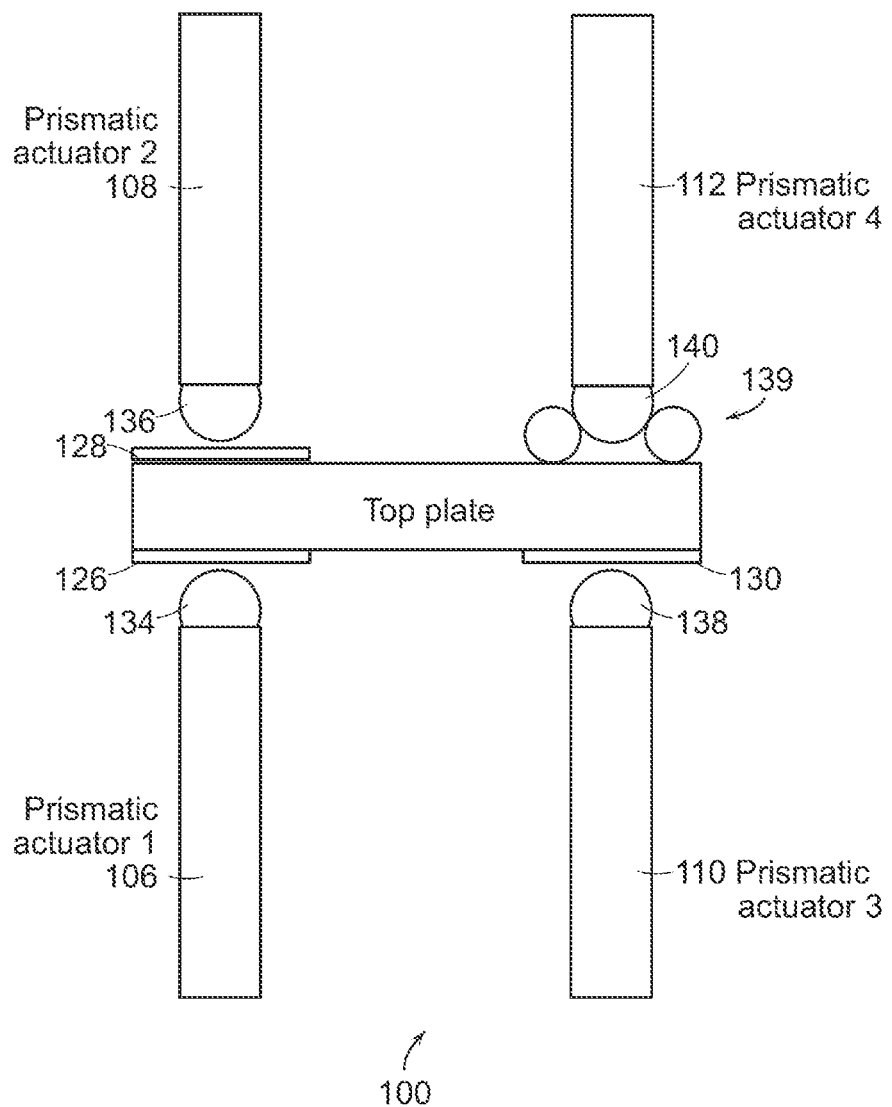
FIG. 15 is a top view of an embodiment of a five-axis stage employing cylinder magnets in a joint, in accordance with principles of the inventive concepts.

A four axis stage with a constrained Z axis in which other degrees of freedom are not interfered with may be implemented in accordance with principles of inventive concepts by using a rigid beam to constrain or restrict movement such Z axis movement, or by replacing one of the four five-DOF actuator joints with a four-DOF joint, restricting motion in the Z axis, as illustrated in FIG. 15.

FIGS. 2-9, in combination, provide views of example embodiments of a four axis positioning stage in accordance with principles of inventive concepts.

Figure 2:
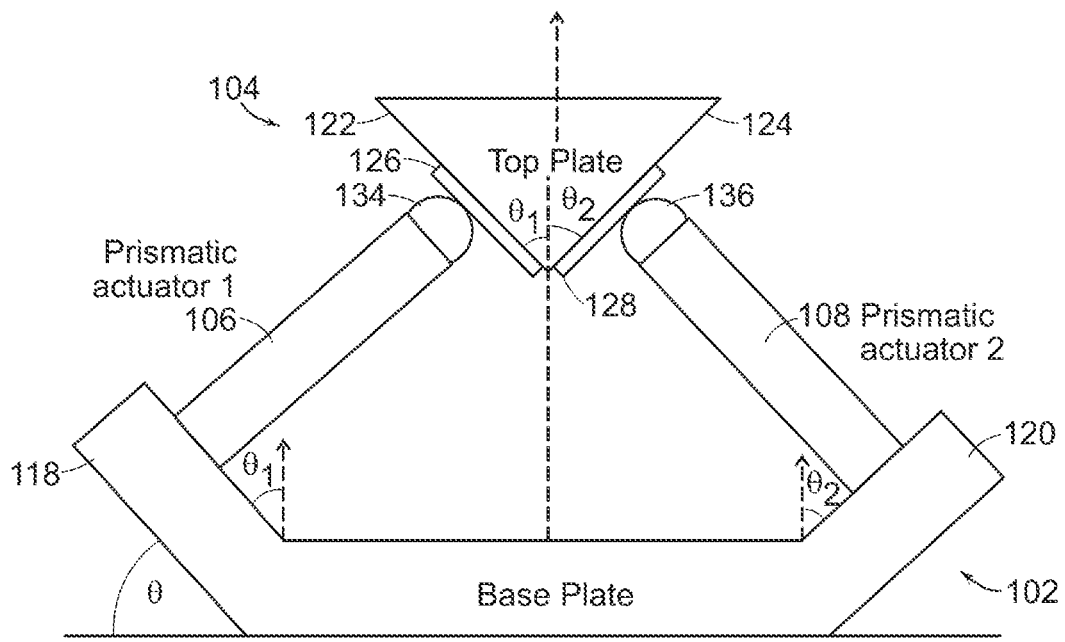
FIG. 2 shows a front end view of embodiment of a four-axis stage, or positioner with all actuators retracted, wherein a third actuator (not shown) is behind the first actuator and a fourth actuator (not shown) is behind the second actuator.

FIG. 2 shows a front end view of embodiment of a four-axis stage, or positioner with all actuators retracted, wherein a third actuator (not shown) is behind the first actuator and a fourth actuator (not shown) is behind the second actuator. FIGS. 5-9 shows the third and fourth actuators. As can be seen, for example, from FIG. 9, third actuator is behind first actuator and fourth actuator is behind second actuator.

With respect to FIG. 2, all actuators are retracted in this view. In this example embodiment, the positioning stage is a four-axis stage 100 that includes base plate 102, top plate 104, and a plurality of actuators, which can be prismatic actuators. The plurality of actuators includes a first prismatic actuator 106 (i.e., prismatic actuator 1), a second actuator 108 (i.e., prismatic actuator 2), a third actuator 110 (i.e., prismatic actuator 3), and a fourth actuator 112 (i.e., prismatic actuator 4).

In example embodiments, baseplate 102 includes angled side pieces 118, 120 that are formed at an angle $\theta$ with respect to the horizontal, where $\theta=\theta_1=\theta_2$ in this embodiment. In other embodiments, it may be possible for $\theta_1 \neq \theta_2$. Sides 122, 124 of top plate 104 are formed at the same angle $\theta$ to the horizontal. Therefore, side piece 118 of the base plate 102 is parallel to side 122 of the top plate 104 and side piece 120 of the base plate is parallel to side 124 of the top plate 104. In the embodiment of FIG. 2, the base plate 102 includes an intermediate portion from which the side pieces 118 and 120 extend. The intermediate portion can be a planar piece that lies in the horizontal plane, but the intermediate portion need not be planar in all embodiments.

In this embodiment, each of the actuators 106, 108, 110, and 112 extends from one of the side pieces 118, 120 of the base plate 102, in a direction toward the top plate 104. For example, in this embodiment, each actuator is secured or coupled to a side piece of the base plate 102 and extends at an angle of 90 degrees with respect to the corresponding side piece 118 or 120 toward the corresponding side 122 or 124 of the top plate 104.

A distal end of each actuator 106, 108, 110, and 112 includes a magnetic material. In this embodiment, each of the actuators 106, 108, 110, and 112 includes ferrous metal hemispheric ends 134, 136, 138 and 140. Magnets 126, 128, 130, and 132 are disposed on or in the sides 122, 124 of the top plate 104 in locations corresponding to the ferrous metal hemispheric ends 134, 136, 138, and 140 of respective actuators 106, 108, 110, and 112.

Figure 3:
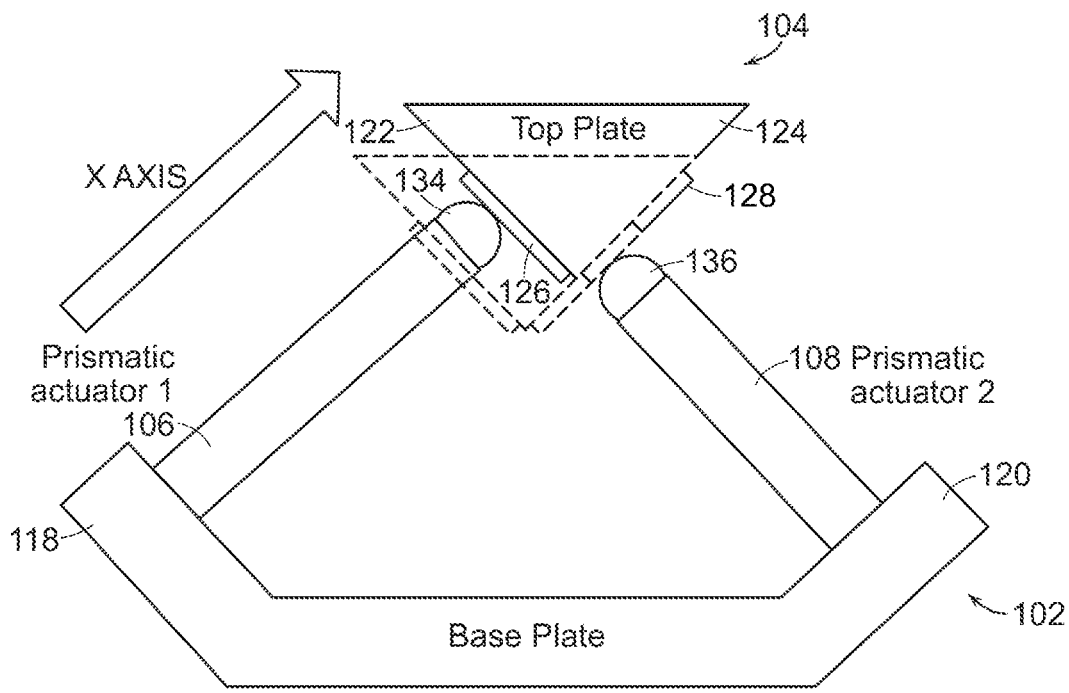
FIG. 3 shows the same front end view of the four-axis stage of FIG. 2, with the first actuator and third actuator extended along an axis ("×AXIS")

FIG. 3 shows the same front end view of the four-axis stage of FIG. 2, with the first actuator and third actuator extended along an axis ("X AXIS"). In FIG. 3 the first actuator 106 and the third actuator 110 are extended to move the top plate 104 in the direction of the X axis, as indicated by the X-AXIS arrow. As previously indicated, third actuator 110 (actuator 3) is behind first actuator 106 (actuator 1) and the fourth actuator 112 (actuator 4) is behind the second actuator 108 (actuator 2). In example embodiments, actuator 1 106 and actuator 3 110 are extended the same amount in order to provide purely X axis movement. Broken lines indicate the original location of the top plate 104 and magnets 126, 128, which is the position of the top plate in FIG. 2.

Figure 4:
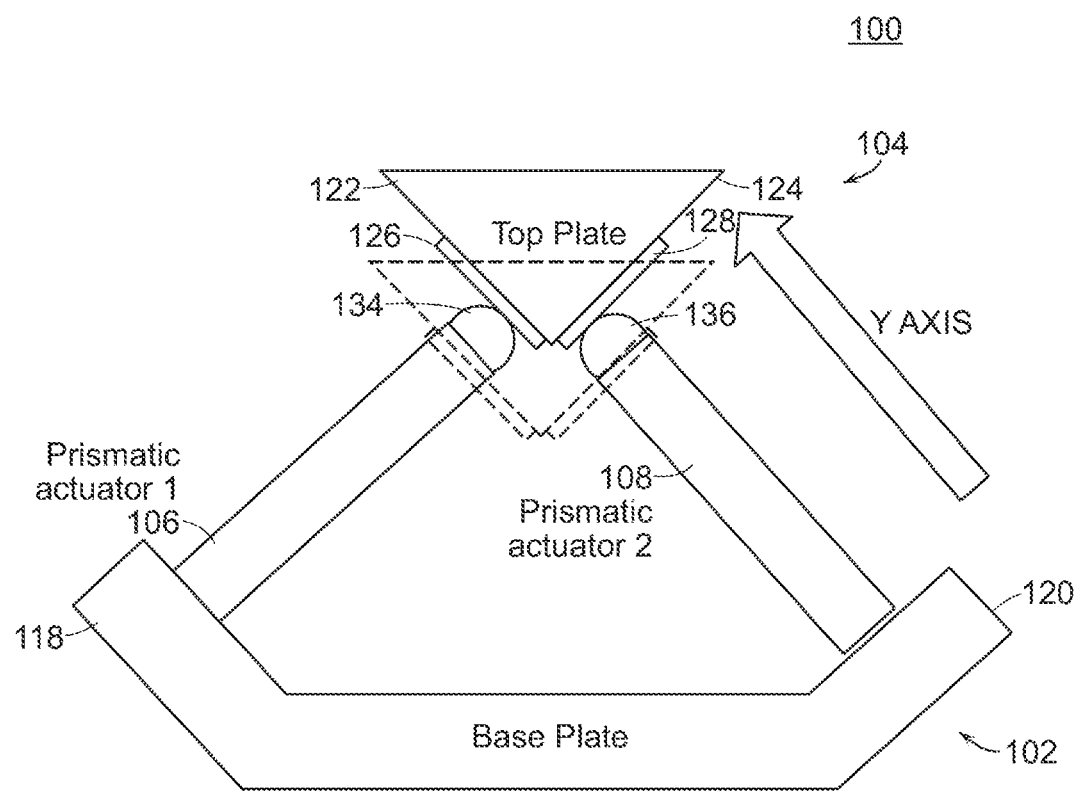
FIG. 4 shows the same end view of the four-axis stage of FIG. 2, with the second actuator and the fourth actuator extended along an axis ("Y AXIS")

FIG. 4 shows the same end view of the four-axis stage of FIG. 2, with the second actuator and the fourth actuator extended along an axis ("Y AXIS"). In the example embodiment of FIG. 4, actuators 1 106 and 3 110 (X axis) and actuators 2 108 and 4 112 (Y axis) are extended. As previously indicated, third actuator 110 is behind first actuator 106 and fourth actuator 112 is behind second actuator 108. In example embodiments, the first actuator 106 and the third actuator 110 are extended the same amount in order to provide X axis movement and second actuators 108 and fourth actuator 112 are extended the same amount in order to provide Y axis movement. Broken lines indicate the original location of the top plate 104 and magnets 126, 128.

FIG. 5 shows a first (left) side view of the four-axis stage of FIG. 2, with the first and third actuators extended along the "X AXIS", wherein a second actuator (not shown) is behind the first actuator and a fourth actuator (not shown) is behind the third actuator. In the example embodiment of FIG. 5, the first actuator 106 and the third actuator 110 are extended by the same amount to produce movement solely in the direction of the X axis. Second actuator 108 is behind first actuator 106 and fourth actuator 112 is behind third actuator 110 from this perspective. Broken lines indicate the original location of the top plate 104 and magnets 126, 130.

FIG. 6 shows a second (right) side view, opposite the first (left) side view, of the four-axis stage of FIG. 2, with the second and fourth actuators extended along the "Y AXIS", wherein the first actuator (not shown) is behind the second actuator and third actuator (not shown) is behind the fourth actuator. In the embodiment of FIG. 6, the second actuator 108 and the fourth actuator 112 are extended the same amount to produce movement solely in the direction of the Y axis. First actuator 106 is behind second actuator 108 and third actuator 110 is behind fourth actuator 112 from this perspective. Broken lines indicate the original location of the top plate 104 and magnets 128, 132.

Figure 7:
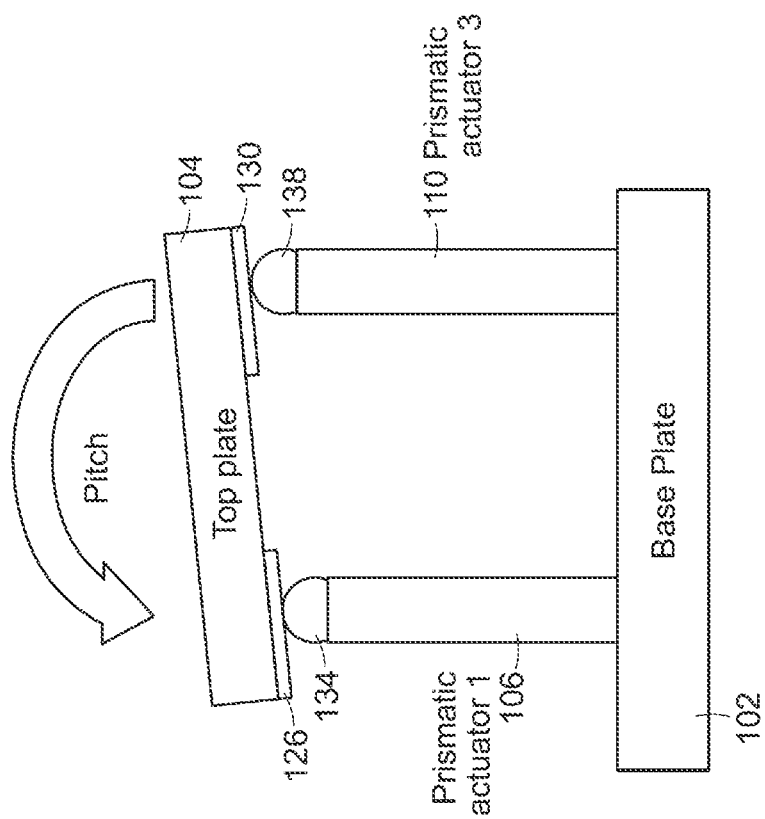
FIG. 7 shows the first (left) side view of the four-axis stage of FIGS. 2 and 5, with the first actuator retracted and the third actuator extended to pitch the top plate, wherein the second actuator (not shown) is behind the first actuator and the fourth actuator (not shown) is behind second actuator.

FIG. 7 shows the first (left) side view of the four-axis stage of FIGS. 2 and 5, with the first actuator 106 retracted and the third actuator 110 extended to pitch the top plate 104, wherein the second actuator 108 (not shown) is behind the first actuator and the fourth actuator 112 (not shown) is behind second actuator.

Figure 8:
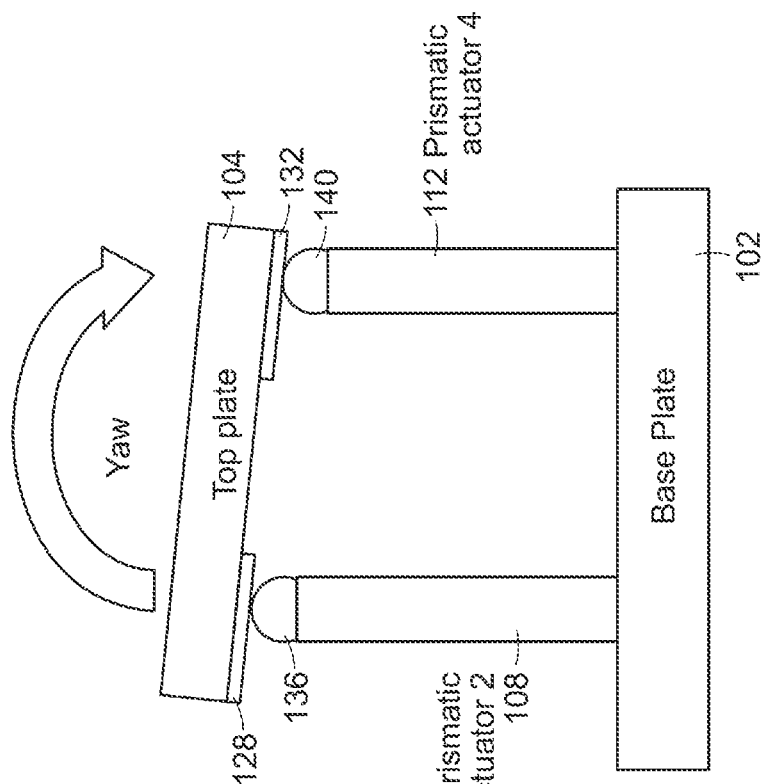
FIG. 8 shows the second (right) side view of the four-axis stage of FIGS. 2 and 6, with the second actuator extended and the fourth actuator retracted to yaw the top plate, wherein the first actuator (not shown) is behind the second actuator and the third actuator (not shown) is behind fourth actuator.

FIG. 8 shows the second (right) side view of the four-axis stage of FIGS. 2 and 6, with the second actuator 108 extended and the fourth actuator 112 retracted to yaw the top plate 104, wherein the first actuator 106 (not shown) is behind the second actuator and the third actuator 110 (not shown) is behind fourth actuator.

Figure 9:
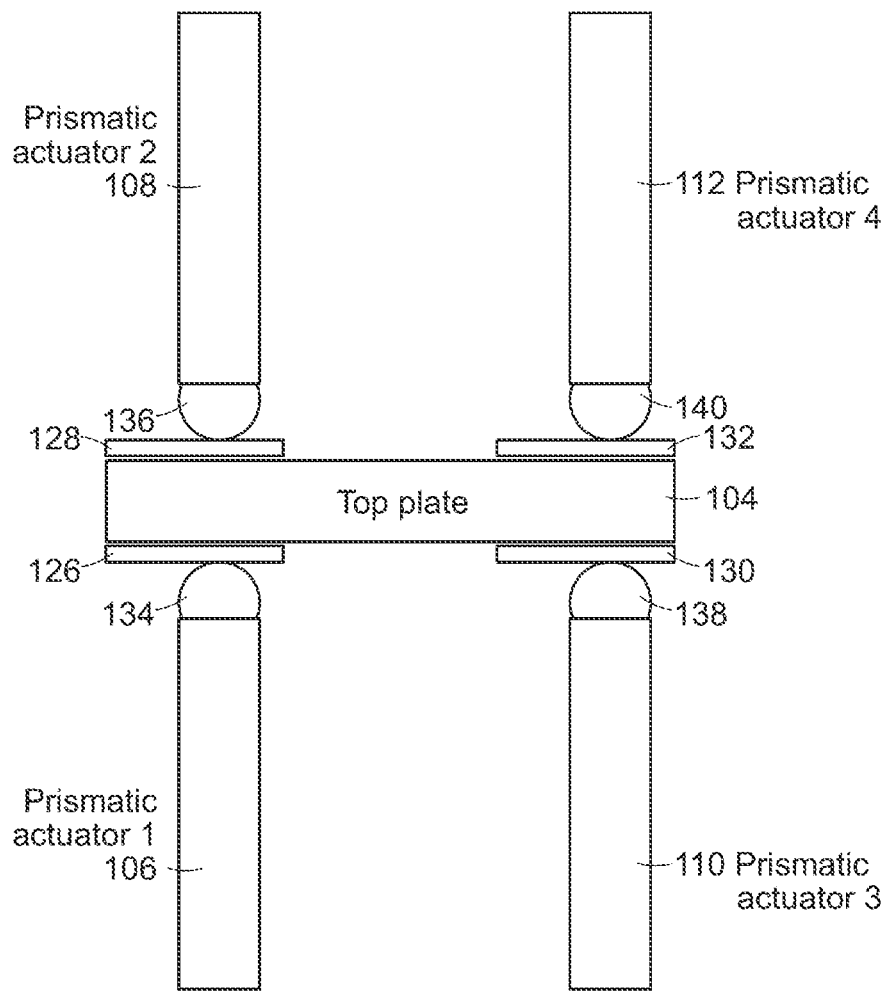
FIG. 9 shows a top view of the four-axis stage of FIG. 2, with the base plate omitted for clarity.

FIG. 9 shows a top view of the four-axis stage of FIG. 2, with the base plate 102 omitted for clarity. In the example embodiment of FIG. 9, a top view of a four-axis stage in accordance with principles of inventive concepts illustrates the relative position of first, second, third, and fourth actuators 106, 108, 110, and 112, along with respective associated magnets 126, 128, 130, and 132 and top plate 104.

FIG. 10 shows a table of single axis/dual actuator moves that can be applied to a four-axis stage, in accordance with principles of the inventive concepts. The table of FIG. 10 illustrates combinations of dual actuator moves that implement top plate movements in accordance with principles of inventive concepts. For example, to extend the top plate solely in the positive X axis direction, first actuator 106 and third actuator 110 are extended while second actuator 108 and fourth actuator 112 are left in place; to extend the top plate solely in the positive Y axis direction, second actuator 108 and fourth actuator 112 are extended while first actuator 106 and third actuator 110 are left in place.

Figure 12:
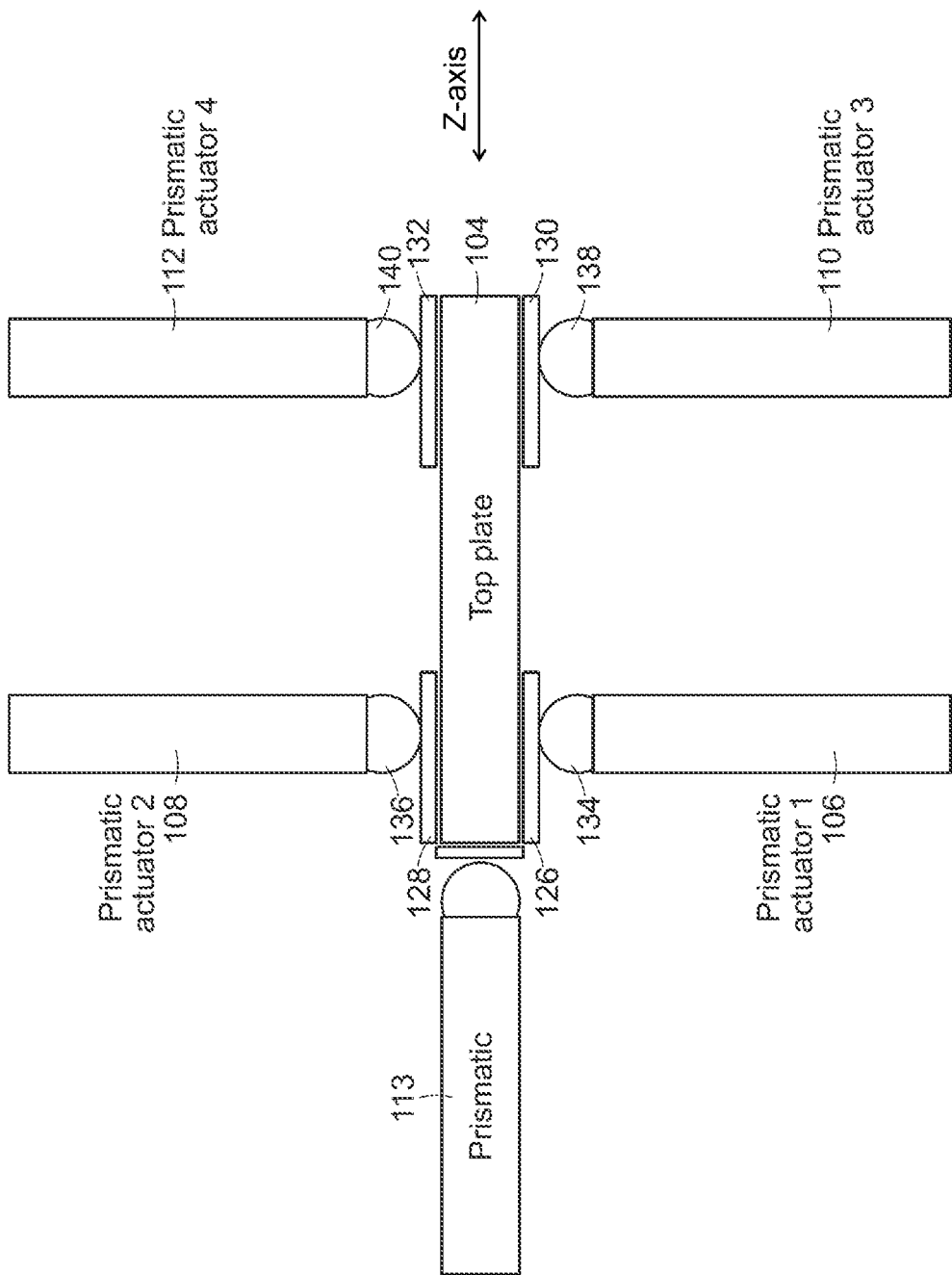
FIG. 12 shows an embodiment of a five-axis stage top view, in accordance with principles of the inventive concepts.

FIG. 11 shows a table of single axis/single actuator moves that can be applied to a five-axis stage, in accordance with principles of the inventive concepts. For example, FIG. 12 shows a fifth actuator 113 added to affect movement of the top plate 4 in a Z AXIS, which lies in a horizontal plane. In other embodiments, a sixth actuator could be provided opposite the fifth actuator.

The table of FIG. 11 shows single axis, single actuator movements of the fifth actuator 113, as an example, if added to the actuators 106, 108, 110, and 112. That is, the table of FIG. 11 could be appended to the table of FIG. 10 if five actuators were used. Therefore, a five-axis stage, such as that illustrated in FIG. 12, can be provided with movement in the positive Z axis direction effected by extension of fifth actuator 113 and movement in the negative Z axis direction effected by retraction of fifth actuator 113. In example embodiments in which a four axis stage is used, with Z axis constrained, fifth actuator 113 may be replaced with a rigid beam, for example.

Figure 13:
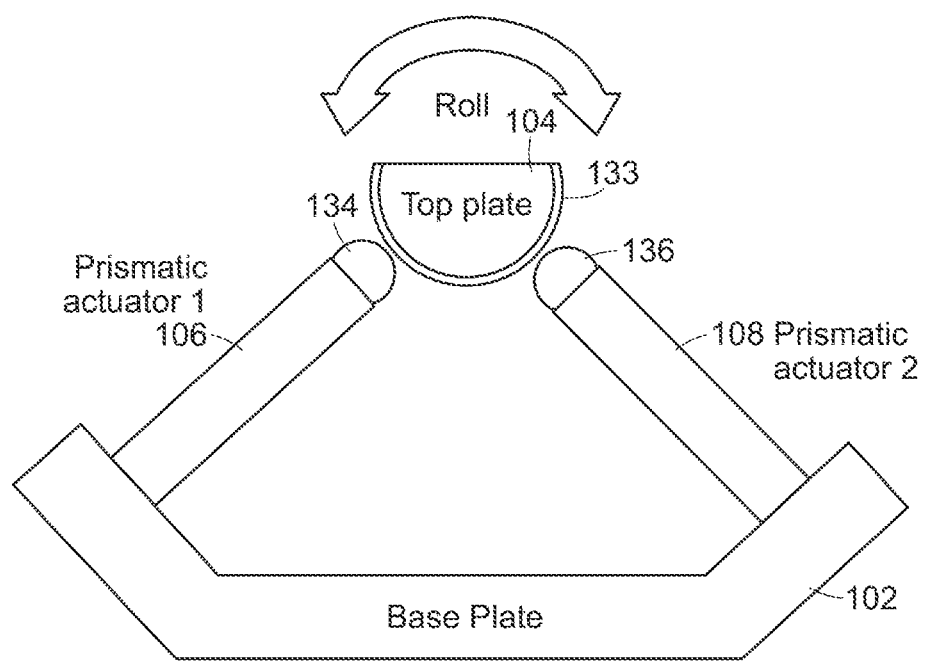
FIG. 13 shows another embodiment of multi-axis stage that can achieve a "roll" motion of a top plate, in accordance with principles of the inventive concepts.

FIG. 13 shows another embodiment of multi-axis stage that can achieve a "roll" motion of a top plate, in accordance with principles of the inventive concepts. In an example embodiment in accordance with principles of inventive concepts, a sixth axis of motion, roll, may be introduced as illustrated in FIG. 13. In this example embodiment top plate 104 is semi-cylindrical, as is magnet 133. In such example embodiments, the operation of the sixth axis does not interfere with operation of the other five. The roll can be achieved through selective extending and/or retracting of actuators 106, 108, 110, and 112. A fifth actuator 113 could again be optional and provided if movement in the Z-axis was intended.

Figure 14C:
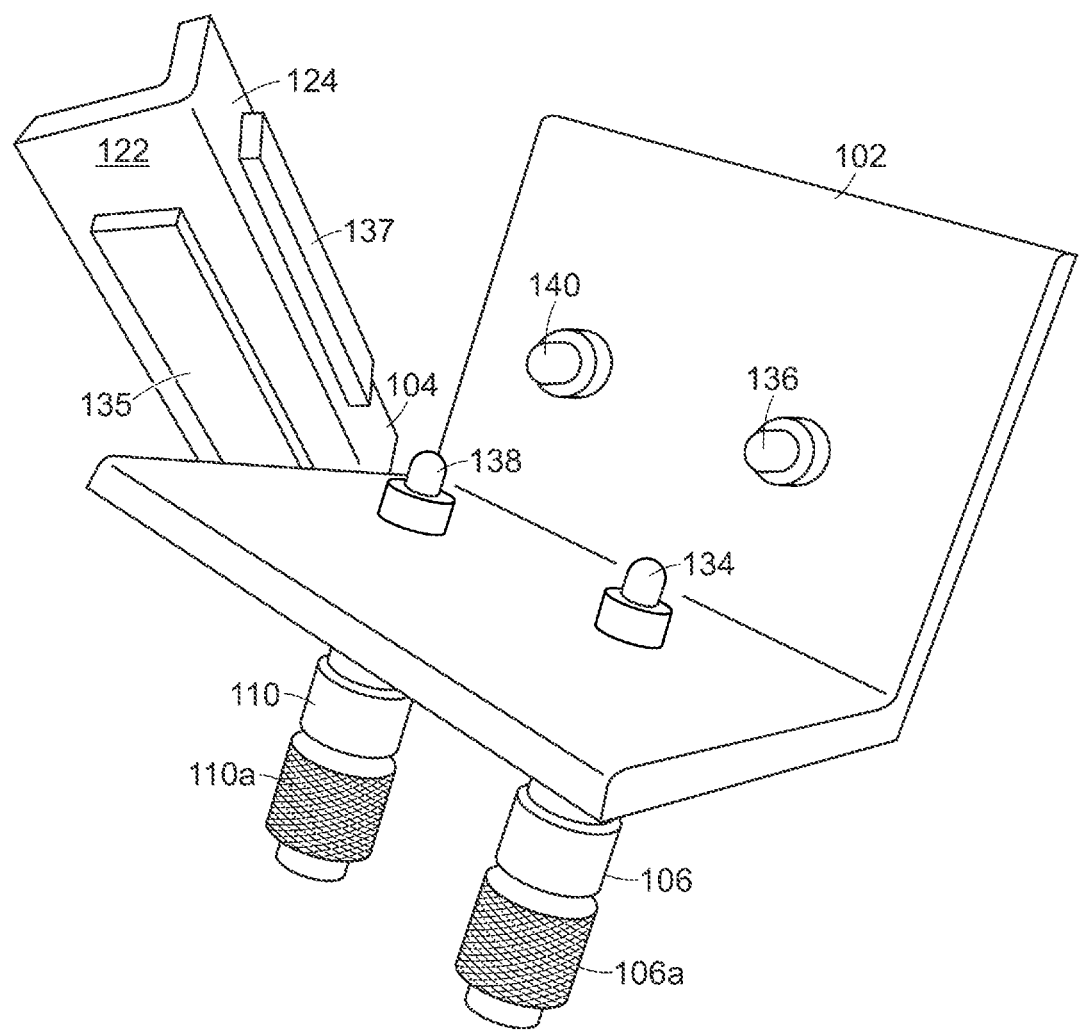

FIGS. 14A, 14B, and 14C provide end, perspective, and exploded views, respectively, of an example positioner in accordance with principles of inventive concepts. In this example embodiment, top plate 104 and baseplate 102 are V-shaped, with sides having the same angle θ with respect to the horizontal, where $\theta = \theta_1 = \theta_2$ in this embodiment. In other embodiments, it may be possible for $\theta_1 \neq \theta_2$. In this example embodiment, first through fourth actuators 106, 108, 110 and 112 penetrate baseplate 102 to contact magnets 135, 137 positioned on sides of top plate 104.

Magnets 135 and 135 are disposed on or in the sides 122, 124 of the top plate 104 in locations corresponding to the ferrous metal hemispheric ends 134, 136, 138, and 140 at distal ends of respective actuators 106, 108, 110, and 112.

In example embodiments actuators 106, 108, 110, and 112 may be precision adjustment mechanisms, such as micrometer screws 106a, 108a, 110a, 112a, that allow single-digit micron precision adjustment.

FIG. 15 is a top view of an embodiment of a five-axis stage employing cylinder magnets in a joint, in accordance with principles of the inventive concepts. As illustrated in the example embodiment of FIG. 15, one of the magnets 139, in this example embodiment, affixed to top plate 104 may be in the form of cylindrical magnets, for example, that yield a four DOF joint that results in a positioner with restricted motion in the Z axis. The cylinder magnets could be configured, by bending, for example, to yield a sixth axis, of roll.

Figure 16:
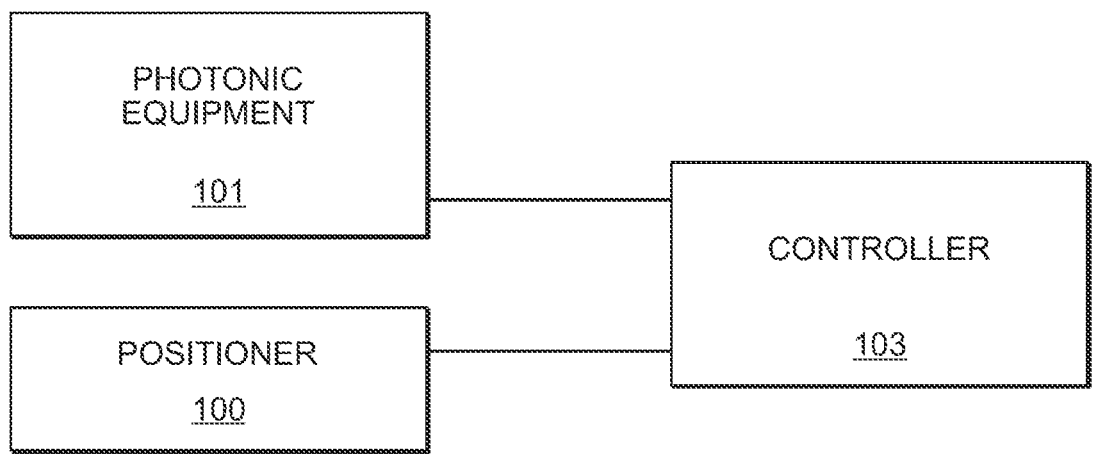
FIG. 16 is a block diagram of an embodiment of a photonic positioner, including electronic controller, in accordance with principles of inventive concepts.

FIG. 16 is a block diagram of an embodiment of a photonic positioner, including electronic controller, in accordance with principles of inventive concepts. The block diagram of FIG. 16 depicts a photonic system 200 that employs a photonic device 101, such as a fiber splicer or component thereof, such as an alignment device, in conjunction with a positioner 100 in accordance with principles of inventive concepts. In example embodiments, positioner 100 is controlled by controller 103, which operates the positioner's actuators in a manner previously described to precisely move photonic device 101. Such movement may allow for the alignment of optical fiber ends, for example. Controller 103 may receive feedback, for example, from photonic equipment 101 that the controller employs to adjust positioner 100. In example embodiments in which the photonic equipment 101 is a splicer, for example, sensors indicative of the quality of alignment between fibers may provide indicia to controller 103, which employs such indicia to adjust positioner for precise alignment of optical fibers, for example.

Figure 17A:
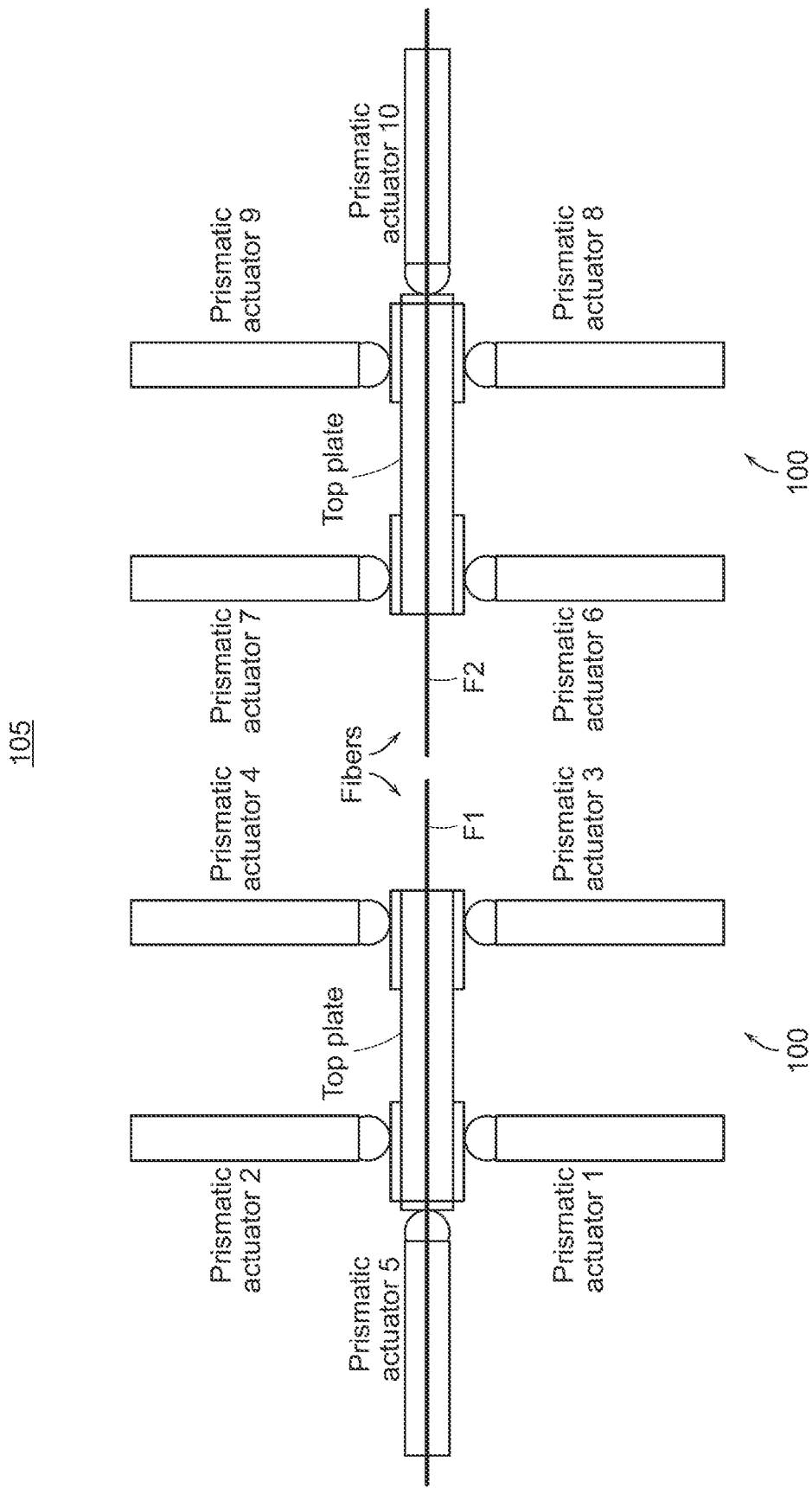
FIG. 17A is a top view of an embodiment of a photonic positioner system that employs a four-axis stage, in accordance with principles of inventive concepts.
Figure 17B:
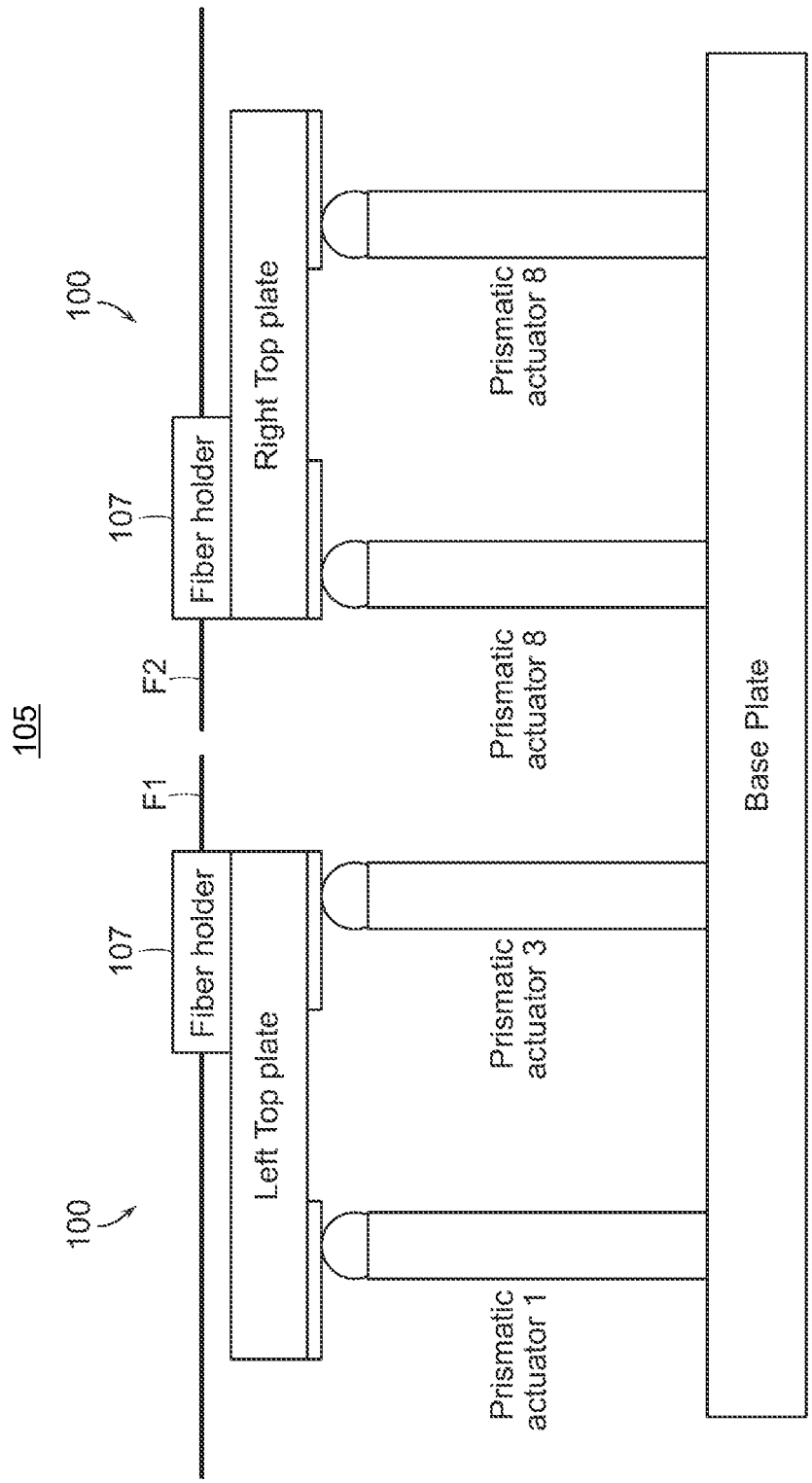
FIG. 17B is a side view of the photonic positioner system of FIG. 17A.

FIGS. 17A and 17B are top and side views, respectively, of a photonic positioner system 105 that employs positioners in accordance with principles of inventive concepts. In this example embodiment a pair of positioners 100 each support an optical fiber end F1, F2 for splicing. Each positioners 100 may be manipulated, as previously described, for example, using an electronic controller 103 to align the ends of fibers F1, F2 for splicing by an optical fiber slicer including a heating element, such as a plasma heater (not shown), that is configured to heat the fiber ends once aligned using positioners 100. In example embodiments the top plates of positioners 100 may include or support fiber holders 107. Such fiber holders are known and may include grooves in an otherwise flat top surface for holding one or more fibers in place for positioning and splicing.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A positioner, comprising:
   a base plate;
   a holder having a first angled side and a second angled side;
   a plurality of actuators, each actuator at an angle relative to horizontal and having a first end coupled to the base plate and a second end in slidable contact with the first or the second angled side of the holder,
   wherein the plurality of actuators is configured to move the holder relative to the base plate in response to extension or retraction of one or more of the plurality of actuators.

2. The positioner of claim 1, wherein:
   at least two of the plurality of actuators maintains contact with the holder through a slidable joint having four degrees of freedom.

3. The positioner of claim 1, wherein:
   at least four of the plurality of actuators maintains contact with the holder through a slidable joint having four degrees of freedom.

4. The positioner of claim 1, wherein:
   at least two of the plurality of actuators maintains contact with the holder through a slidable joint having five degrees of freedom.

5. The positioner of claim 1, wherein:
   at least four of the plurality of actuators maintains contact with the holder through a slidable joint having five degrees of freedom.

6. The positioner of claim 1, wherein:
   one or more of the plurality of actuators is disposed at an angle of about 90 degrees with respect to the first or second angled side of the holder.

7. The positioner of claim 1, wherein:
   each of the plurality of actuators is disposed at an angle of about 90 degrees with respect to the first or second angled side of the holder.

8. The positioner of claim 1, wherein the positioner is a four-axis positioning stage.

9. The positioner of claim 1, wherein the base plate includes a first angled side in parallel with the first angled side of the holder when actuators from the plurality of actuators disposed between the first angled side of the base plate and the first angled side of the holder are in a neutral position.

10. The positioner of claim 9, wherein the base plate includes a second angled side in parallel with the second angled side of the holder when actuators from the plurality of actuators disposed between the second angled side of the base plate and the second angled side of the holder are in a neutral position.

11. The positioner of claim 10, wherein a neutral position is a position where an actuator is not extended.

12. The positioner of claim 1, wherein at least one actuator from the plurality of actuators has a second magnetic end that forms a slidable joint with the first or second angled side of the holder.

13. The positioner of claim 1, wherein the second end of two or more actuators from the plurality of actuators forms a magnetic joint with the first or second angled side of the holder.

14. The positioner of claim 1, wherein the second end of each of the plurality of actuators forms a magnetic joint with the first or second angled side of the holder.

15. The positioner of claim 1, wherein the holder includes a groove configured to hold an elongate item.

16. The positioner of claim 15, wherein the elongate item is at least one optical fiber.

17. The positioner of claim 15, wherein the holder is V-shaped.

18. The positioner of claim 1, further comprising:
   an electronic controller operatively coupled to the plurality of actuators and configured to cause the plurality of actuators to extend and/or retract to selectively move the holder to a specified position.

19. The positioner of claim 18, wherein:
   the actuators are configured such that the same amount of extension or retraction of any pair of actuators produces movement of the holder solely along a single axis, and said extension or retraction is carried out under control of the electronic controller.

20. The positioner of claim 18, further comprising:
   one or more sensors configured to detect a position of the holder and communicate sensor data indicative of the position of the holder to the electronic controller via a feedback loop and the electronic controller is configured to cause the plurality of actuators to adjust the position of the holder in response to the sensor data.

* * * * *